United States Patent [19]

Jung et al.

[11] 4,264,876
[45] Apr. 28, 1981

[54] SOLAR POWERED IODINE LASER

[75] Inventors: Check K. Jung, Brooklyn; Harold E. Whalen, Dix Hills, both of N.Y.

[73] Assignee: Sperry Corporation, New York, N.Y.

[21] Appl. No.: 825,348

[22] Filed: Aug. 17, 1977

[51] Int. Cl.$^2$ .................. H01S 3/045; H01S 3/091; H01S 3/22
[52] U.S. Cl. .................. 331/94.5 P; 331/94.5 D; 331/94.5 G
[58] Field of Search .................. 331/94.5 P, 94.5 G, 331/94.5 D, 94.5 C

[56] References Cited

U.S. PATENT DOCUMENTS

| 3,451,010 | 6/1969 | Maiman | 331/94.5 P |
| 3,786,370 | 1/1974 | Barry et al. | 331/94.5 P |

OTHER PUBLICATIONS

Barry et al., IEEE Trans. on Communications, vol. COM 24, No. 4, pp. 470-478, Apr. 1976.
Brederlow et al., IEEE J. of Quantum Electronics, vol. QE 12, No. 2, Feb. 1976, pp. 152-153.

Primary Examiner—William D. Larkins
Attorney, Agent, or Firm—Howard P. Terry

[57] ABSTRACT

A stabilized satellite device located outside of the earth's atmosphere collects solar energy, converting it by photochemical or other laser interactions into a beam of infrared energy directed toward a power utilization station, such as at the earth's surface, the wave length of the infrared energy lying within a non-attenuating pass-band in the earth's atmosphere. Sections of the laser are cooled by a directive radiator system aligned toward outer space.

11 Claims, 14 Drawing Figures

SOLAR POWERED IODINE LASER

CROSS REFERENCE BETWEEN RELATED APPLICATIONS

Filed concurrently on Aug. 17, 1977 were two related patent applications in the names of C. K. Jung and H. E. Whalen, Ser. No. 825,348, entitled "Solar Laser Power System" and Ser. No. 825,352, entitled "Improved Solar Laser Power System" both assigned to Sperry Rand Corporation.

BACKGROUND OF THE INVENTION

1. Field of the Invention

The invention generally relates to the conversion of solar energy into forms suitable for substantially unattenuated transfer through the earth's atmosphere for use in performing useful work, for instance, at the earth's surface or elsewhere, and more particularly concerns a stabilized photochemical laser satellite device for the conversion of solar energy directly into laser energy in the form of a relatively narrow wave length band of electromagnetic energy used remotely for electrical power generation or the like after passage through the earth's atmosphere, for example.

2. Description of the Prior Art

It is readily recognized that a vast quantity of solar energy is received daily upon the earth's surface and by its atmosphere and is daily re-radiated into space and lost, a quantity quite sufficient to supply many present and future needs for electrical and other power. Direct heating and cooling of individual buildings have long been successfully achieved by circulating fluids through solar energy collectors, then storing the heat for later use. Mirrors have been used at the earth's surface to track the sun and to concentrate the solar flux into a receiver at the earth's surface to generate steam for driving electrical generators.

Photovoltaic arrays at the earth's surface have produced electricity from the sun's rays by a non-thermal process. Natural collection of solar energy takes place on and near the earth's land and ocean surfaces and may be exploited by extracting energy from accumulated rainfall, or from the wind or tides. One important conversion mechanism is bioconversion, whereby growing plants store solar energy that is later released directly by burning the plant or, for example, by its chemical conversion to a fuel such as an alcohol.

Solar energy is not free, any more so than is power from other convertible resources; the initial cost of any mechanism for its mass conversion into electrical or other energy of form suitable for distribution by present or future distribution systems is considerable. Of greater significance is the fact that the solar energy received at the earth's surface is highly variable. The time of day (or night), the season of the year, and scattering or attenuation of solar energy due to weather conditions, all seriously affect the magnitude of solar flux intercepting any area of the earth. However, the solar radiation impinging upon a surface of standard area normal to the sun's rays and disposed above the earth's atmosphere is found to be large and substantially constant.

The problem of efficient conversion of solar radiation into useful electrical or other power has stimulated the publication of several untried suggestions, some radical indeed. Of these suggestions, one which has apparently been given serious consideration was fostered in the article "Solar Power From Satellites" appearing as a release of Arthur D. Little, Inc., in the Feb. 1977 issue of *Physics Today*, pages 30 through 38. So as to enjoy the use of the greater magnitude, more nearly constant solar flux densities available above the earth's atmosphere, it was proposed to assemble in space above the earth's atmosphere enormous arrays of photovoltaic cells held together by a frame having dimensions about 5 by 13 kilometers. The photovoltaic cells would generate sufficient electrical energy to power an array of synchronized microwave generators coupled to a directionally controlled microwave radiating antenna for directing a microwave beam to a receiving antenna positioned at the end of the line of sight, as at the earth's surface. The microwave energy thus arriving at the earth's surface is not in suitable form for direct use and must be converted to more conventional form if it is to be generally distributed. Furthermore, the several microwave oscillators must be frequency and phase synchronized by complex control means.

Essentially, the prior art proposal requires a double conversion process; a narrow band of the solar energy is first converted to high voltage electricity (20 k.v.d.c.) by the solar cell array and the microwave oscillators then convert the high voltage energy to microwave energy. Solar cells having efficiencies of 15 percent have been reported, but experience shows that this value is rarely met and seriously decreases with each year of use. Microwave generators are also relatively inefficient devices and reach reasonably good efficiencies only by the use of heavy devices for producing permanent magnet or solenoid focussed electron beams. Many other factors tend to decrease system efficiency, and overall efficiency of the proposed system does not appear to be attractive in view of the enormous total mass and cost of construction and operation of the system.

For example, it is estimated that the aforementioned approximately 5 by 13 kilometer solar cell array and its associated microwave and control equipment would be transported piece by piece from the earth to be assembled in space. Further, the operating power station would clearly need maintenance during its operating life and the costs of both of these operations are significant in determining the economic feasibility of the concept. Operating costs alone of the huge structure $(18.2 \times 10^6 \text{ kg})$, not including consumables, is significant; the energy cost alone of stabilizing the giant platform can be enormous. Most discouraging is the fact that the vast scope of the structure does not lend itself to a reasonably uncomplex test of a model of size conveniently put into space by a single rocket.

SUMMARY OF THE INVENTION

The present invention provides a means for the efficient collection of substantially unattenuated solar energy at a station normally outside of the earth's atmosphere and for its conversion at that station in a single conversion process into a beam of electromagnetic energy of a wave length relatively unattenuated by the earth's atmosphere so that it may be directed therethrough to a collector and utilization apparatus located at or near the earth's surface, for example. Solar energy is focussed upon a photochemical laser chamber containing a lasable gas medium, causing it to photolyze and resulting in inversion that generates an intense infrared beam directed toward a remote infrared collector, for example. The gas flowing within the cavity is then cooled and returned to the active region. The unwanted heat is removed from the laser chamber by directive means oriented toward cold outer space and away from all heat sources such as the sun and the earth.

A satellite power station according to the present invention is compact and relatively efficient, employing a single relatively high efficiency transformation of solar energy into a beam of electromagnetic energy capable of passing through the earth's atmosphere with relatively little loss. Furthermore, the energy if in the form of an infrared beam, once reaching its destination, may be used directly, as in a solar furnace or for generating steam. Solar cells are avoided as primary power sources so that the satellite may be relatively compact and long-lived. Microwave vacuum tubes and heavy electron beam focussing devices and the attendant needs to generate and to distribute high voltages and for microwave phase and frequency stabilization are all avoided.

DESCRIPTION OF THE PREFERRED EMBODIMENTS

The structure of the novel solar power generation system preferably includes a photochemical gas laser for generating and radiating a beam of electromagnetic energy, directional means for efficiently coupling solar energy into the laser, means for coupling the generated beam of intense energy from the laser for productive use, such as at an earthborne or other power utilization station, and means for efficiently cooling the laser by coupling degraded energy in the form of heat therefrom into a region of space itself devoid of significant energy sources. The novel power generation system is preferably stabilized in a generally geosynchronous orbit with respect to the earth and its solar energy direction input elements are stabilized to maximize receipt of solar radiation by known satellite stabilizer devices such as sun trackers or inertial wheels or the like. Such means may be used cooperatively in the conventional manner or in cooperation with other known types of satellite stabilization apparatus.

Figure 1:
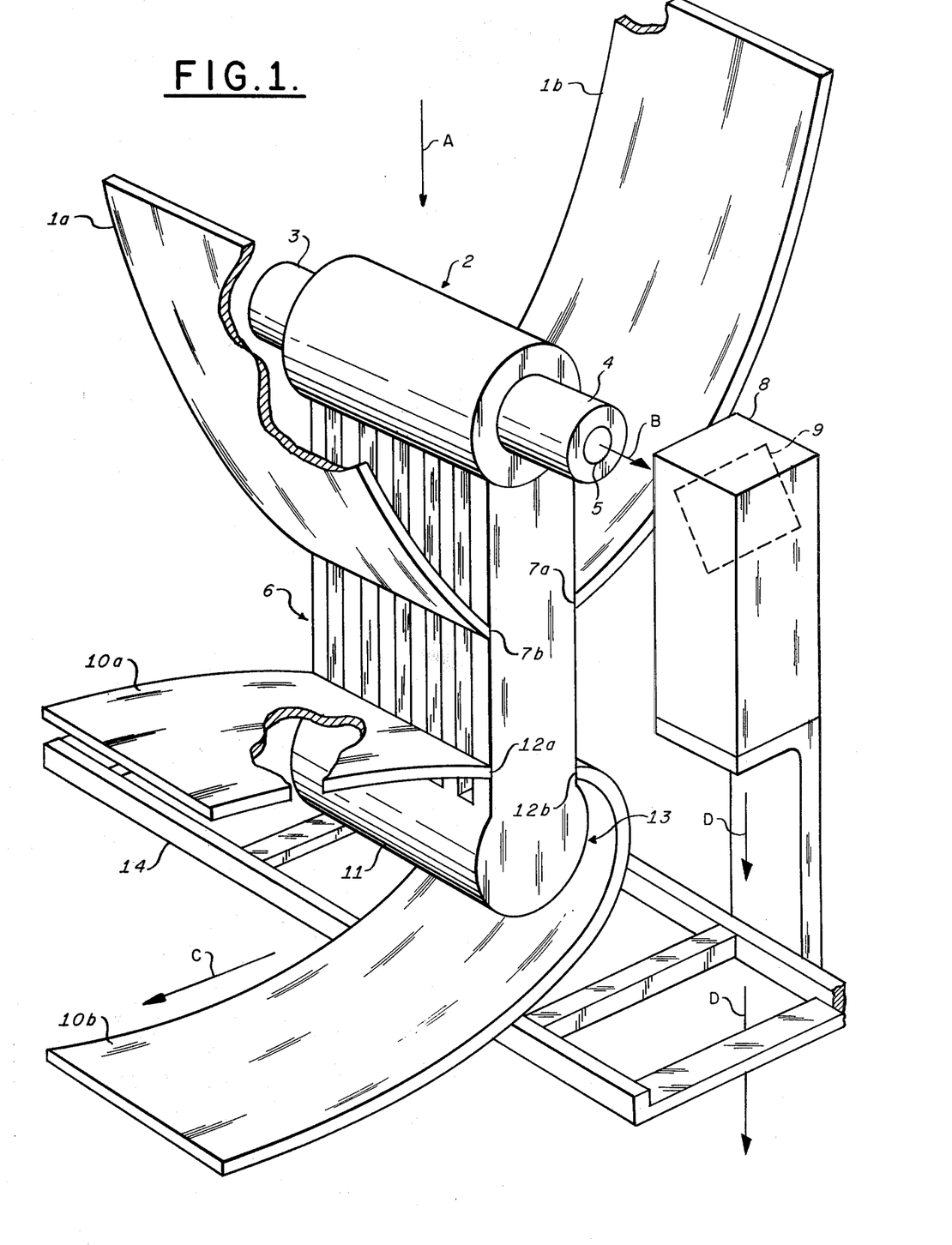
FIG. 1 is a perspective view, partly cut away, of a preferred form of the invention.

For performing the power generation function, the novel gas laser system includes the several successive sections seen fully in FIGS. 1 through 6, including a photochemical laser generally indicated in FIG. 1 at 2 along with a parabolic concentrating cylinder 1a, 1b for directing solar energy as indicated generally by arrow A at its generally cylindrical exterior surface. Laser 2 includes cylindrical end parts 3 and 4 containing optical laser elements yet to be discussed with respect to FIG. 5. Laser 2 is connected at its lower portion to an elongate heat transfer device 6 for removing unwanted heat from laser 2 and for its radiation in a particular manner into free space. Heat transfer device 6 may include an array of low impedance heat-conducting paths made of copper bars, for example, or a pumped fluid may be used for heat transfer, as will be further discussed. At the end of heat transfer device 6 remote from laser 2 is disposed a thermal radiator 13, which may take the form of a circularly cylindric black body radiator disposed in energy exchanging relation at the focus of a second parabolic cylinder 10a, 10b. Parabolic cylinders 1a, 1b and 10a, 10b may be supported directly from heat transfer device 6 with respect to the platform frame 14 or by other support means (not shown) coupled to frame 14, whose nature will be readily apparent to those skilled in the art. While the envelope of laser 2 is transparent at least to useful wave bands of solar energy, the exterior cylindric surface 11 of radiator 13 is coated with a suitable electromagnetic energy radiator material such as pyrolytic graphite, for example, so that it may act as an efficient black body radiator for the thermal energy to be removed from radiator 13.

To make the apparatus thus far described fully functional, concentrated solar energy must be applied to the gas within laser 2. For this purpose, the platform frame 14 supporting the apparatus is oriented by conventional solar tracking equipment so that the solar energy collector 1a, 1b is always oriented for collecting maximum solar energy so as to apply it efficiently through the external surface of gas laser chamber 2 to the interior laser gas. The directed collector may take any of several forms, of which a cylindrical parabola form is shown in FIG. 1. Half parabola cylinders 1a, 1b are shown in the figure affixed at their ends 7a, 7b for convenience near the cylindrical parabola vertex to the outer sides of heat transfer device 6. It will be obvious to those skilled in the art that additional supporting and strengthening frame elements of conventional nature such as tie rods 100 of FIG. 6 may be used with solar collector 1a, 1b and it will be understood that such elements are generally omitted from the drawings merely as a matter of convenience and because they do not necessarily form an essential part of the invention. It will also be understood that suitable equipment and techniques for stowing the half parabolas and the parts of other energy directing elements yet to be described and for releasing them into their operating positions are readily available in the art and that details of such apparatus are quite properly omitted from the drawings in the interest of avoiding needless complication thereof. The surfaces of the half parabolas 1a, 1b facing the input surface of laser 2 are treated so as to render them as nearly as possible one hundred percent reflective of the solar energy. Polished stainless steel sheets or nickel steel optically coated with aluminum are suitable, though other materials may be employed.

As mentioned in the foregoing, it is particularly desirable to cool the black body radiator 13 as much as possible. According to the present invention, radiator 13 is protected from receiving heat from all other significant heat sources, such as by the parabolic cylinder system 10a, 10b shown in FIG. 1. It is convenient to fasten segments 10a, 10b of the parabolic system to opposite exterior sides 12a, 12b of the heat transfer device 6, for example as shown in FIG. 1, so that the parabolic axis or the radiating plane of symmetry thereof is at right angles to the plane of symmetry of half parabolas 1a, 1b. In this manner, the parabola segments 10a, 10b, which may be constructed generally similarly to half parabolas 1a, 1b, are oriented so that they can collect none of the sun's rays, nor can they collect energy from the other significant radiator on the scene, which is the earth itself and its atmosphere. In addition, the parabola segments 10a, 10b cannot collect any significant energy from the laser output beam B passing out of aperture 5, nor from its beam D after being diverted toward the earth by mirror 9 as controlled by mechanism such as that of FIG. 11 and disposed within container 8. In fact, the only thing seen by the parabola system 10a, 10b is cold outer space, a condition highly desirable for most efficient operation of the cylindrical radiator 13 and its immediately associated parts. Of course, this desirable condition is sustained when the platform frame 14 is stabilized about both pitch and roll axes and when the solar parabola system 1a, 1b is directed precisely at the sun so that the radiation path of cylindrical parabola 13 towards cold outer space is represented generally by arrow C.

Figure 2:
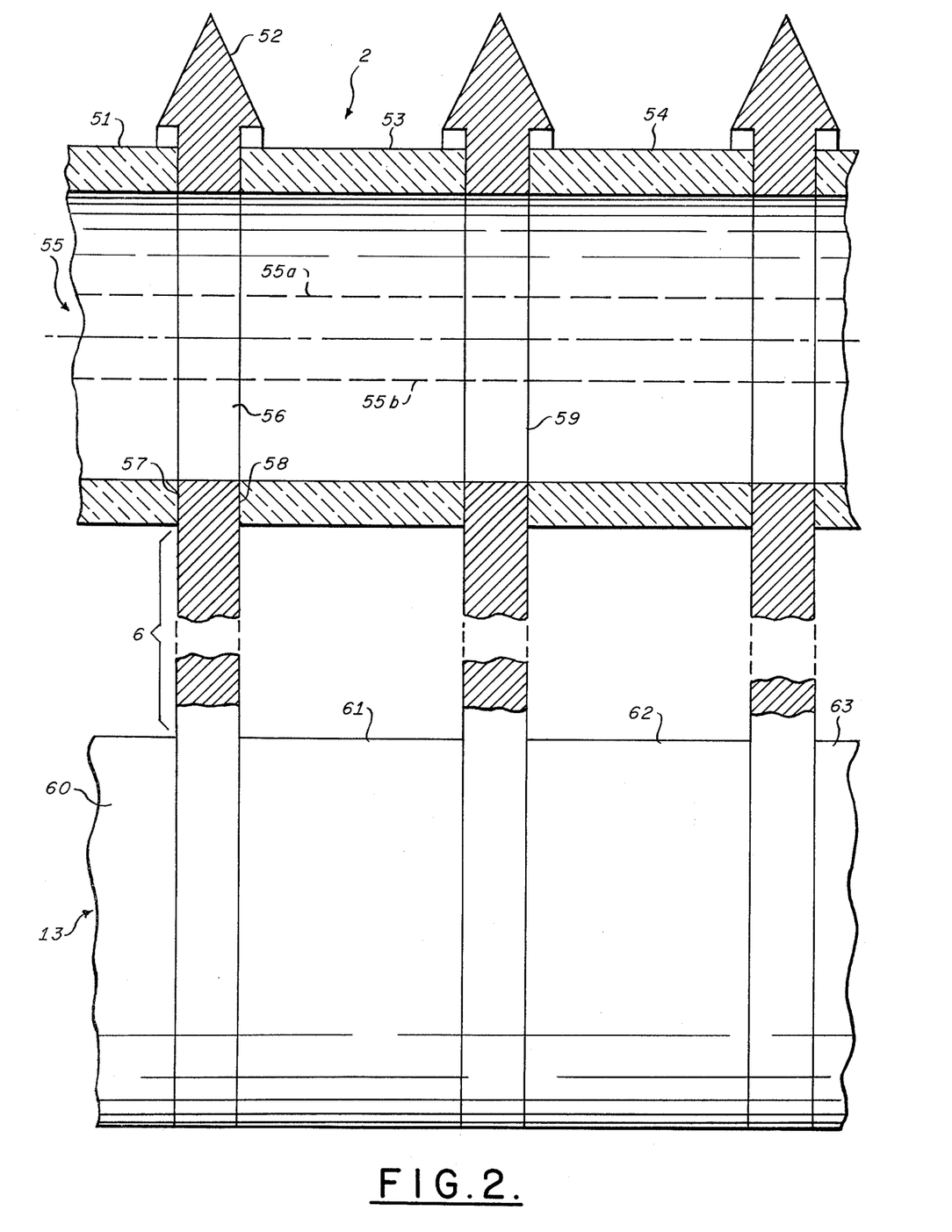
FIG. 2 is a cross section view of a portion of FIG. 1.
Figure 3:
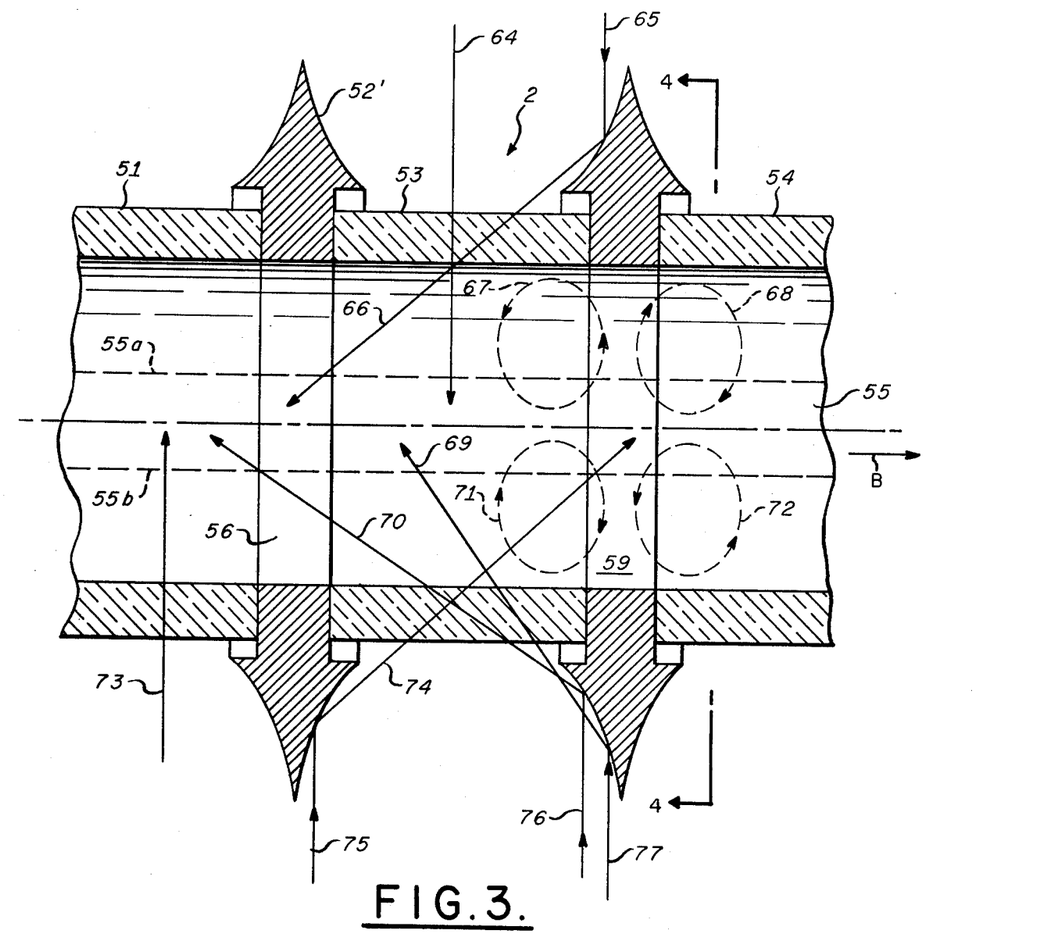
FIG. 3 is a cross section view of a portion of the apparatus of FIGS. 1 and 2.
Figure 4:
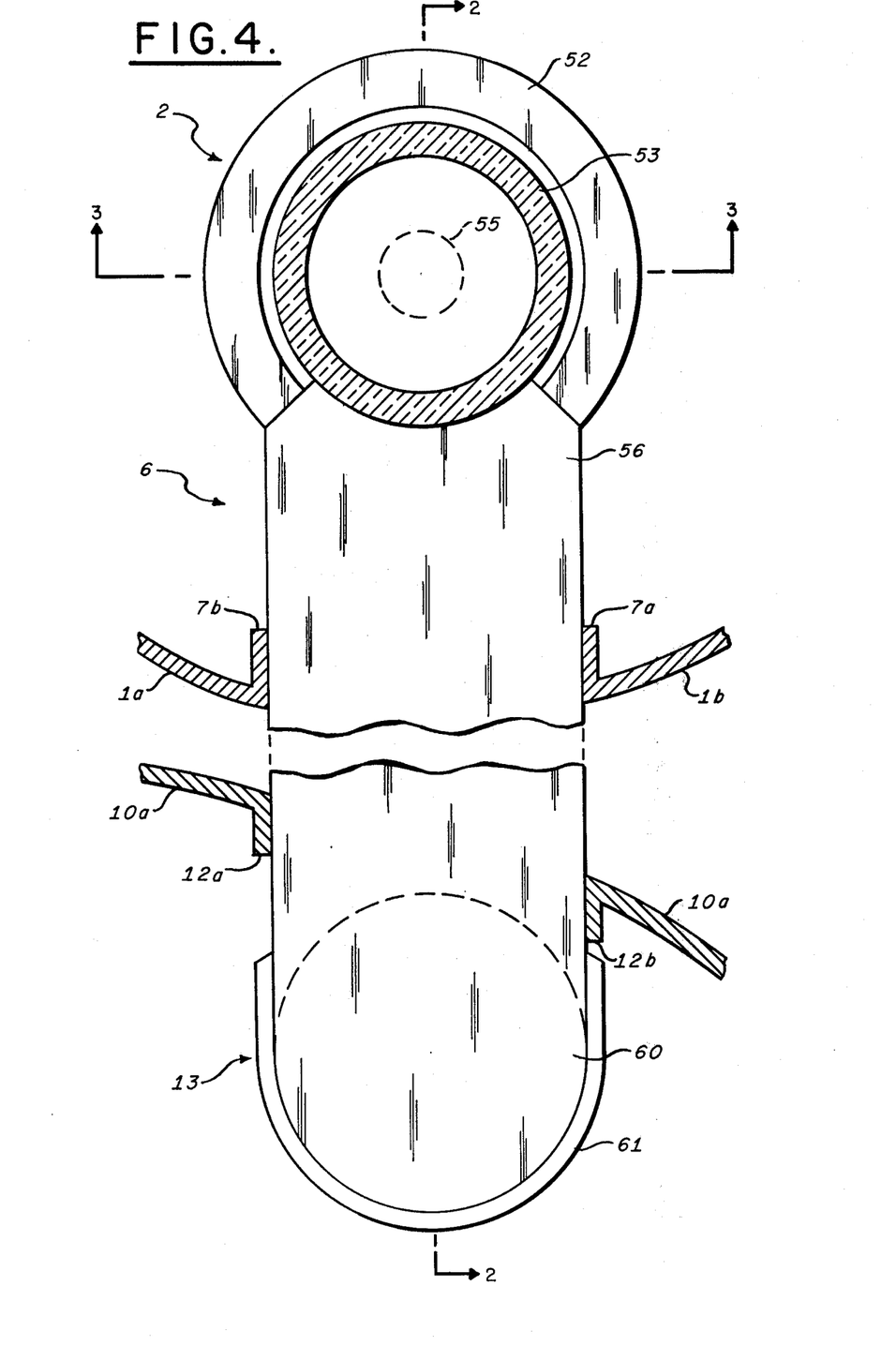
FIG. 4 is an end view, partially in cross section, of the apparatus of FIG. 2.

The laser 2 preferably takes the form of a photochemical gas laser, its novel features being shown in more detail in FIGS. 2 and 3. The active transparent cylindrical chamber or envelope of laser 2 is formed by a collinear array of hollow tubes such as tubes 51, 53, 54 which may be made of quartz or of another material transparent to solar energy or to a desired spectral portion thereof. The hollow envelope tubes, such as tubes 51, 53, 54, are separated by the apertured ends of metal heat transfer elements, such as devices 56, 59. The walls of the coaxially aligned apertures at the first ends of the heat transfer elements 56, 59 preferably have the same shape and diameters as the inner walls of the envelope tubes 51, 53, 54, as is seen in FIGS. 2, 3, and 4. Any convenient method of sealing the opposed faces of the separating heat transfer elements 56, 59 to the cooperating end faces of the envelope tubes, as at seals 57, 58, may be used, including known glass-to-metal seals or conventional gasketed or other seals widely used in the vacuum and gas tube arts.

As seen in FIG. 2, the copper or aluminum heat transfer elements 56, 59 extend as massive heat conducting slabs or bars affixed downward and are affixed to the heat conducting cylindrical radiator 13. In the heat transfer region 6, the elements 56, 59 and their companions are spaced apart, leaving an open volume surrounding each tubular envelope element 51, 53, 54 so that solar energy collected anywhere by the surface of cylindrical parabola 1a, 1b may be focussed into the cylindrical active gas lasing volume 55 bounded by dotted lines 55a, 55b. The radiator 13 may be made up of individual cylinders 60, 61, 62, 63 coated with a black body radiator material and affixed between the slabs such as slabs 56, 59 or may take the form of a single integrated copper rod projecting through elements 56, 59 et cetera, and similarly coated where exposed with efficient heat radiating material.

As seen in FIGS. 2 and 4, the upper major arcuate portion of each of the heat transfer elements may, as indicated in the instance of transfer element 56, be equipped with a sharply peaked or roof-shaped arcuate edge. Solar energy striking the roof plane 52 is reflected through envelope tube 53, for example, for use beneficially within volume 55, thus also avoiding the direct heating of heat transfer element 56. Efficient transfer of this energy is enabled by the use, as shown in FIG. 2A, of a coating 52a of material having high optical reflectivity in the wave length region of interest, such as aluminum or nickel or alloys thereof.

Figure 2A:
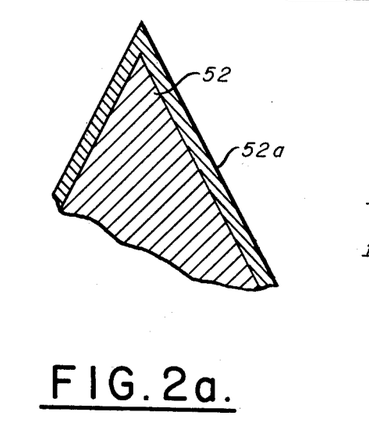
FIG. 2A is a cross section view of a detail of FIG. 2.

The sides of peaked roof 52 may be planar as shown in FIG. 2A, or, as shown in FIG. 3, may be deliberately curved so that the incoming solar energy is evenly or otherwise desirably distributed within the active lasing volume 55. In FIG. 3, rays 73 and 64 represent rays from solar collector 1a, 1b that are directly passed into active region 55 through the tubular envelope cylinders 51, 53. Rays 65, 66 and 75, 74 represent rays striking the respective curved peak elements 52' located on heat transfer elements 56 and 59, which rays now desirably reach the otherwise shaded parts of volume 55. Such rays may be desirably concentrated primarily in the shadowed regions or may also be directed elsewhere, as in the condition illustrated by rays 76, 70 and 77, 69.

Still referring to FIG. 3, operation of the laser with respect to events interior of the laser envelope will be considered. While varieties of gases and gas combinations are found to yield efficient generation of energetic output beams such as at various infrared frequencies and may be employed according to the present invention, a system yielding high energy from solar excitation is preferably based on photochemical gas laser principles. For example, some inorganic molecules such as $Cl_2$ and $H_2O$ and organic molecules such as $C_3F_7I$ or $CF_2I$ may be used as the principal laser gas, since they very efficiently generate an energetic beam at a 1.315 micron wave length, for example. The $C_3F_7I$, or perfluoralkyliodide material, decomposes upon irradiation, particularly by the energetic ultravoilet portion of the sun's spectrum, being photolyzed into $C_3F_7$ and excited iodine molecules. After photolysis and cooling, a series of chemical reactions is understood to occur, recombination of $C_3F_7I$ being the most prominent reaction. Other gases may be added desirably to increase the stimulated emission cross section by deactivating the lower level of the laser gas, as is well known, including helium, argon, or $CO_2$. Other combinations of gases may be employed.

Referring particularly to FIG. 3, the dotted orbits 67, 68, 71, 72 represent typical paths taken by the principle and derived gases during laser operation. The region within the generally circularly cylindric space 55 represents the volume of the gas in which the major part of the useful solar energy is active, thereby breaking down the $C_3F_7I$ molecules and radiating infrared energy in the axially located laser beam B. The intensely cold interior surface of the aperture within heat transfer element 59, for example, tends to pump the gaseous decomposition products in a generally radial direction into the cooled, shadowed region of the aperture, where they are cooled and whence they are returned toward the hot region 55 as generally indicated by the counter-rotating orbits 67, 68, and 71, 72. Reconstruction of the $C_3F_7I$ molecules takes place near the cooled aperture inner surface, whereupon the molecules are reexcited, the lasing process continuously repeating itself at a constant level. Action within the other heat transfer elements 56, et cetera, is similar. It will be understood that the illustrated shape and locations of orbits 67, 68, 71, 72 are idealized average orbits drawn with a view of explaining one possible mechanization of the operation of the invention and that they are not intended to be interpreted in a limiting sense. In any event, the presence of a good optical pass band in the region of the 1.315 micron wave length in the gases forming the earth's atmosphere makes the iodine laser further attractive for present purposes. It is found that intense solar heating of the gas mixture and its subsequent rapid cooling efficiently produces the large population inversion needed in the present invention for power generation at a remote site.

Figures 5, 7:
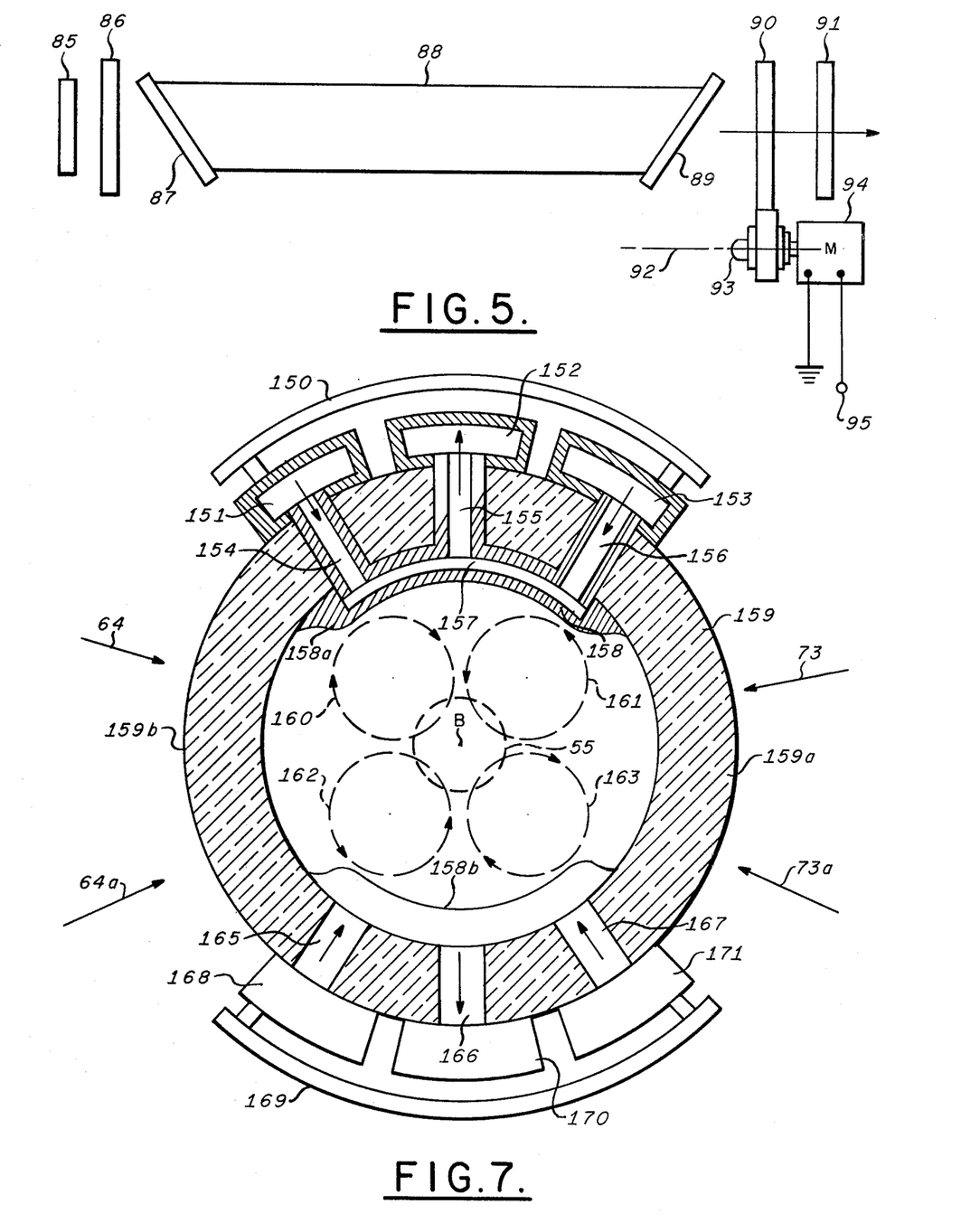
FIG. 5 is a schematic view of laser apparatus used in the upper portion of FIGS. 1 and 2.
FIG. 7 is a cross section view of an alternative form of the invention.

FIG. 5 illustrates schematically the optical elements normally employed with a gas laser of the general type of that employed in the present invention. In this figure, laser 88 is shown schematically as having a simple tubular envelope so that the drawing is not unnecessarily complex. The laser 88, as employed at 2 in FIG. 1 of the present invention, will include the usual slanted end windows 87, 89, constructed, for example, as taught by J. M. Abdale et al in the U.S. Pat. No. 3,717,823 for a "Metal-Glass Laser Window Assembly," issued Feb. 20, 1973 and assigned to Sperry Rand Corporation. The mirrors 85 and 91 at opposite ends of laser 88 provide the usual reflection functions to define the length of the resonant cavity of the laser, mirror 85 being totally reflecting and mirror 91 being partly transmitting and partially reflecting. A conventional line selector grating 86 may be employed, if desired. Shutter 90 is opened by its rotation on shaft 93 about axis 92 when motor 94 is activated by a control signal supplied at terminal 95 by means yet to be described in connection with FIGS. 12 and 13. Removal of shutter 90 from the path of beam B permits laser 88 to start operation once illuminated by solar energy.

Figure 6:
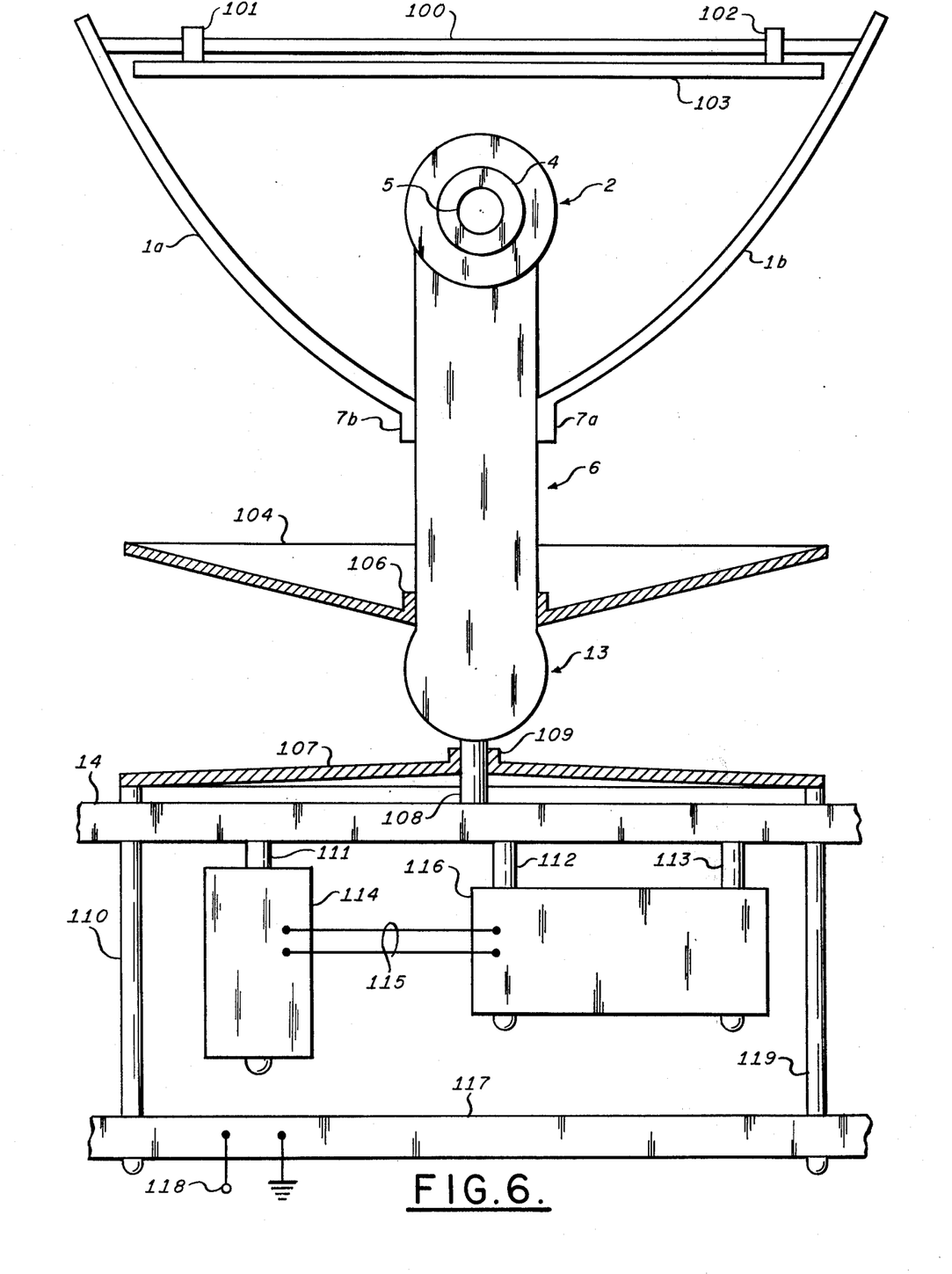
FIG. 6 is an end view, partly in cross section of apparatus similar to that of FIG. 1.

It is within the scope of the present invention to employ other solar energy collector systems in place of the half parabolas 1a, 1b of FIG. 1. For example, a paraboloid of revolution may be substituted for the cylindrical half parabolas 1a, 1b. The structure of FIG. 1 may also be altered beneficially and strengthened by using two pairs of half parabolas like the pair 1a, 1b, but disposed so as to form a generally rectangular or even a square pyramidal solar collector. As previously noted, a system using half parabolas 1a, 1b as in FIG. 6 may be strengthened also by the use of tie rods, such as tie rod 100. Such rods 100 may be used as mounts for supports 101, 102 for suspending an optical filter 103 in the aperture of the parabola system whereby solar wave lengths not useful in laser 2 are eliminated or reflected. In FIG. 6, the cooling of the black body radiator 13 is accomplished by a pair of truncated cones 104, 107 forming a means similar to parabola segment 10a, 10b of FIG. 1 for radiating heat into cold space. The arrangement efficiently projects unwanted heat about a full azimuth sector, again serving to isolate the function of cooling the black body radiator 13 from the effects of any other significant heat source. The truncated cones 104, 107 are respectively provided with flanges 106, 109 at a central aperture which may be rectangular in shape so that flanges 106, 109 may be respectively fastened in good heat transfer fashion with respect to the radiator 13. Cone 104 may be supported directly from the heat transfer system 6 above radiator 13, while the lower cone 107 may be supported by column or columns 108 which also serve to support the laser device relative to platform 14. Other variations of the invention adapted for terrestrial or extraterrestrial use of the energy generated by the device will be apparent from the foregoing to those skilled in the art.

As seen in FIG. 6, the novel power system may be stabilized in space by a conventional stabilization element or elements represented at 114 and 116 in the lower part of FIG. 6 as supported by support links 111, 112, 113 from the platform frame 14. Stabilization device 114 may be a conventional sun tracker linked by multiple conductors 115 to a conventional control device 116. Device 116 may include various known stabilization devices, including controlled moment gyroscopic devices of the kind disclosed in the S. P. Liden U.S. Pat. No. 3,741,500, issued June 26, 1973 for a "C M G Fine Attitude Control System" or other known radio stabilization devices. The moderate level of electrical power needed to operate control and communication apparatus disposed at platform 14 may readily derived from a relatively small conventional array of solar cells 117 supported by links 110, 119 from platform frame 14 and supplying output power at terminal 118 for uses such as those yet remaining to be described. Since few solar cells are required, spare sets may be supplied to be placed in operation when required.

Figure 8:
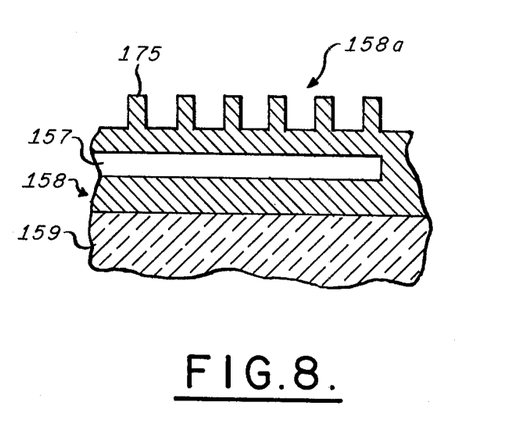
FIG. 8 is a cross section view of a detail of the arrangement of FIG. 7.
Figure 9:
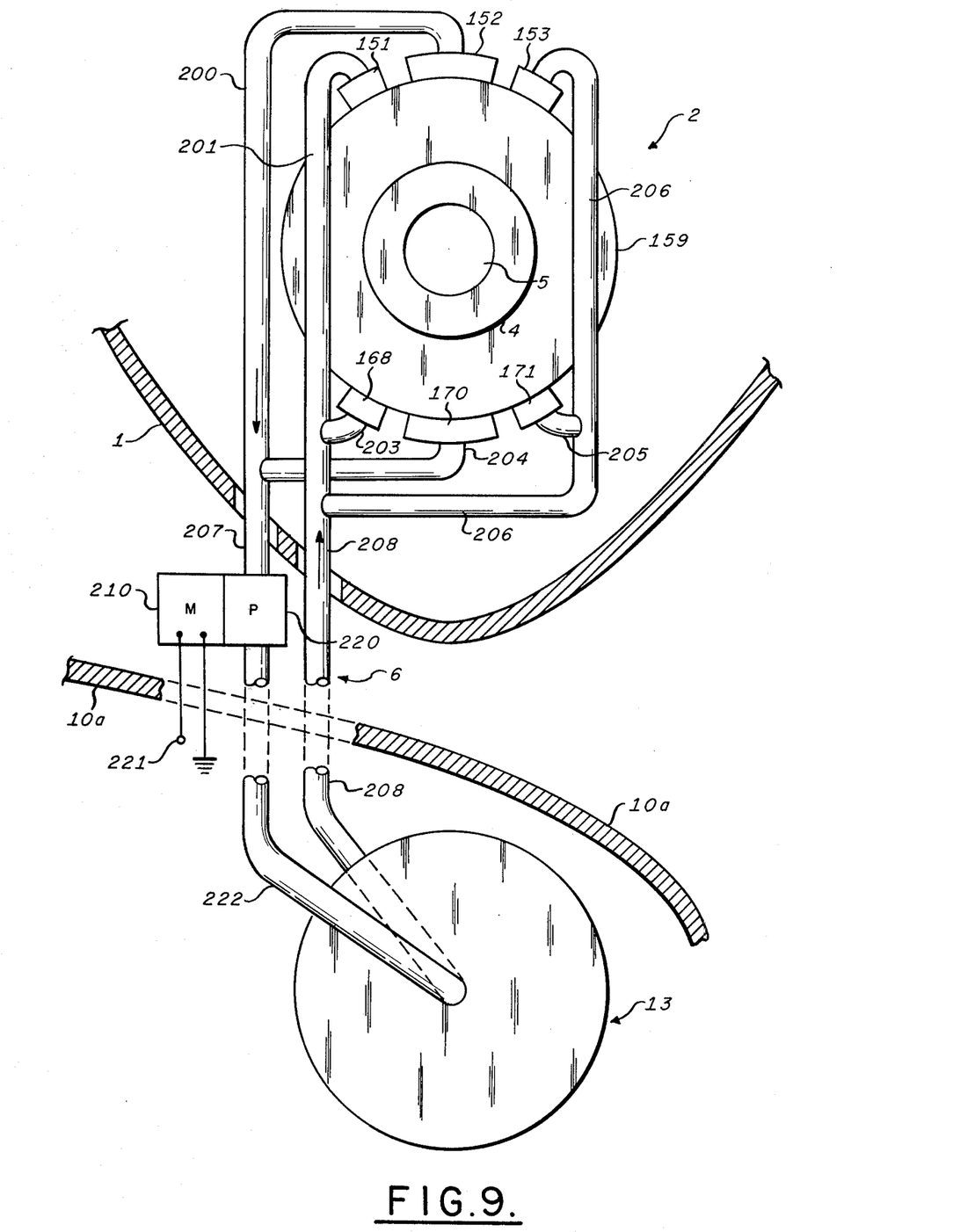
FIG. 9 is an end view, partly in cross section, showing an application of the apparatus of FIG. 7.

Recalling to mind FIGS. 2 and 3, it is understood that the embodiment shown therein has longitudinally alternating transparent sections spaced along the axis thereof and consisting of an array of sections with envelopes efficiently pervious to solar energy, with individuals of an array of cooling (and shadowing) elements placed between the transparent sections. Consequently, circulation of the laser gases is characterized, as previously observed, by a multiplicity of orbits lying in planes including the axis of circular symmetry of the laser (FIG. 3) and forming, in effect, toroidal flow patterns having generally circular symmetry about that same axis. In the embodiment of FIGS. 7, 8, and 9, the four orbits 160, 161, 162, 163, instead extend uniformly and longitudinally, offset with respect to the axis of the laser. Such is accomplished, not by using the longitudinally segmented system of FIGS. 2 and 3, but by use of an angularly segmented system and by irradiating the laser gas with solar energy along a pair of opposed longitudinally extending sectors 159a, 159b of the transparent envelope 159, the gas being cooled along a cooperating pair of interposed sectoral longitudinal cooling surfaces 158a, 158b.

It is seen that the active gas in the cylindrical space 55 is activated by the solar energy of rays such as rays 64, 64a, 73, 73a reflected from parabola sections 1a, 1b and the desired molecular breakdown is thereby achieved. The dotted orbits 160, 161, 162, 163 again represent typical paths taken by the principle and derived gases during operation of the laser. Again, the idealized region generally within the circularly cylindric space 55 represents the gas in which the major portion of the actinic solar energy is absorbed, thereby breaking down the molecules of the primary gas therein and radiating infrared energy along the axially disposed laser beam B. The intensely cold inner surfaces 158a, 158b tend to pump the gas decomposition products out of volume 55 and into the vicinity of the cold surfaces. The decomposition products, when cooled, reconstruct $C_3F_7I$, for example, which is then returned by the circulating flow to hot region 55. In this manner, the columns of gases continuously rotate in the illustrated oppositely rotating orbits, one each being found in a corresponding quadrant of the interior of envelope 159.

For cooperation with the cooling surface 158a, a hollow arcuate element 158 bounded by the surface 158a forms a sectoral insert affixed against a sector of the inner wall of envelope 159. Insert element 158 is fabricated of a good heat conductor, such as cast copper or aluminum, while envelope 159 is normally composed of quartz. The hollow arcuate and elongate interior 157 of insert element 158 extends substantially the length of envelope 159 and, consequently of the laser itself. The opposed longitudinal sides of the hollow interior 157 are coupled through quartz envelope 159 by respective arrays of pipes such as pipes 154, 156. The pipes of the array including pipe 154 are connected at appropriate intervals to a first input distributor conduit 151; likewise, the pipes of the array including pipe 156 are connected at appropriate intervals to a second input distributor conduit 153. The central part of hollow interior 157 is similarly connected at longitudinally spaced intervals by an array of radial pipes, such as pipe 155, passing through envelope 159 into the middle distributor conduit 152. As will be seen from FIG. 9, a suitable coolant is forced through the input distributor conduits 151, 153, through radial pipes such as pipes 154, 156, through the hollow interior 157, and out radial pipes such as pipe 155 to be exhausted by output distributor conduit 152, cooled, and then recirculated. Surface 158a is thus maintained at the desired cold temperature; it will be readily understood that the surface 158b of the oppositely disposed arcuate gas cooling insert may be similarly cooled using as analogous elements distributor conduits 168, 170, 171, radial pipes 165, 166, 167, et cetera. Since the laser is also generally exposed to the heating solar radiation collected by parabola 1a, 1b, arcuate reflecting shields 150, 169 may be used to prevent undesired heating of the coolant conduits 151, 152, 153 and 168, 170, 171 by solar energy.

As shown in FIG. 8, in the longitudinal cross section of the sectoral insert 158, the function of the gas cooling surface 158a may be enhanced by the use of a plurality of parallel arcuate fins, such as the cooling fin 175. These fins may also be beneficially used to aid in fully coercing the gas flow into arbitrary desired orbits such as those shown in FIG. 7. It will also fall within the scope of the present invention to use both or other types of orbital flow within the apparatus, as desired.

Referring to FIGS. 7 and 9, a laser 2 similar to that of FIG. 7 is located for cooperative irradiation of its gas by solar rays reflected from parabola 1. A cooling black body radiator 13 is located for cooperative relation with respect to shield or parabola 10a as previously explained. A fluid pump 220 driven by motor 210 when excited at electrical terminal 221 is located, for example, between pipe 207 and pipe 222 leading into one end of radiant cooler 13. Coolant fluid is pumped through radiator 13 and out of the return pipe 208, which pipe 208 couples cool fluid into branching pipes 201, 203, 205, 206 for flow into the respective input distribution conduits 151, 168, 171, and 153, as previously discussed with reference to FIG. 7. The heated fluid coolant is then collected by output distributor conduits 152, 170 for recirculating flow through pipes 200, 204, 207 and pump 220, et cetera, for cooling by radiator 13.

Figure 10:
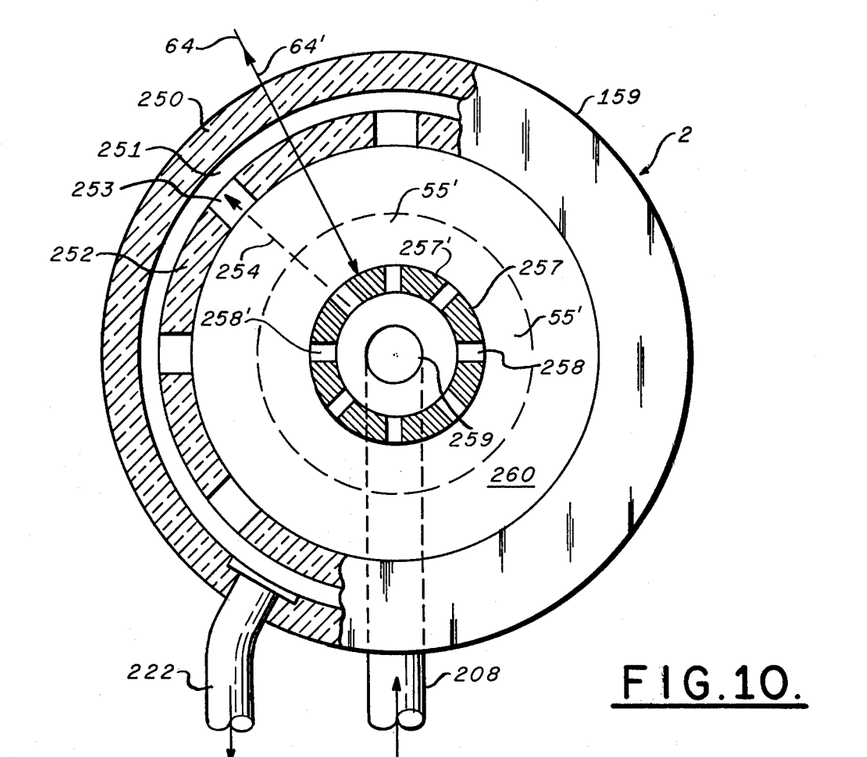
FIG. 10 is a figure similar to FIG. 7 showing a further alternative form of the invention.

In a further embodiment of the invention as shown in FIG. 10, which may be regarded as a variant of the embodiment of FIGS. 7 and 9, the structure is simplified by circulating and cooling the active lasing gas itself, rather than requiring means for achieving the additional heat transfer process necessary to the configuration of FIGS. 7 and 9. For this purpose, the laser gas collected directly in exhaust pipe 222 of FIG. 10 is returned, after cooling in black body radiator 13, by pump 220 (FIG. 9) into inlet pipe 208. The re-recombined gas flows through the central aperture 259 into a longitudinal inner manifold tube 257. Tube 257 has longitudinal arrays of circular arrays of bores such as bore 258 through which the gas exhausts into the annular heated region 55' of the active gas. The gas is energized in the generally tubular region 55' by solar energy passing, as does ray 64, through the quartz envelope 159 of the laser toward the outer surface 257' of the inner supply manifold tube 257. To the extent that ray 64 is partly absorbed by an absorbing surface layer 257' on supply manifold 257, the incoming gas is desirably heated by manifold 257. To the extent that ray 64 activates the gas in volume 55' and is then reflected from surface 257', the reflected energy also tends to activate the gas in volume 55' during the return transit. Because of the kinetics of gas flow in space 55', the gas tends to flow radially, for example, as indicated by the dotted line 254 between inner orifice 258' and the typical exhaust orifice 253.

The laser envelope 159 in FIG. 10 is constructed of two concentric transparent tubes, a solid tube 250 and an inner tube 252, mutually spaced apart so as to define an extended annular gas output manifold 251 and sealed by end parts, such as by end seal 260. Inner tube 252 is supplied with a plurality of longitudinal arrays of circular arrays of bores 253, of which one circular array is seen in the drawing including the representative radial bore 253. Accordingly, the photolyzed gas molecules move generally radially out of the intensely activated region 55' through the arrays of bores 253, the annular space 251, and the exhaust pipe 222 into pump 220 and cooling radiator 13 for return via pipe 208.

While the invention is not at all limited to the arrangement to be illustrated by the following example, the example is none-the-less given to aid the further appreciation of the structure and operation of one configuration of the novel device. It will be understood by those skilled in the art that the device may be scaled according to usual engineering rules, the power output to be expected being generally a function of the square of the volume of gas actively interacting with the incoming solar energy. For example, it is estimated that a configuration such as that of FIG. 2 using $C_3F_7I$ as the active lasing gas may be constructed to generate 1 to 2 kilowatts with the system in a continuously operating mode. The lasing chamber of FIGS. 1, 2 would be substantially 4.0 inches in internal diameter and 60.0 inches long. The internal diameter and length of the laser chamber are selected to be compatible with a readily achievable parabolic collector 1a, 1b. Outside of the earth's atmosphere, the radiant energy of the sun falling on collector 1a, 1b is approximately 1500 watts per square meter of the collector surface, so that the parabolic concentrator 1a, 1b need have an area only about 4.0 square meters, allowing for minor reflection losses. The parabolic cooling reflector system 10a, 10b will generally be similar in size to the solar collector 1a, 1b. In general, the pressure within laser 2 may reach 1 to 1.5 atmospheres. The cooling produced by the cooling elements 6, 13 is such as not to freeze any of the gas components, such as $CO_2$ or argon in the examples being discussed. As has been described, it is necessary to radiate the excessive unwanted heat due to the presence of the low frequency spectrum of the sun and to facilitate the recombination of the photolyzed radicals.

As previously noted, stabilization of platform 14 may be accomplished by the use of a well known radio or inertial stabilization system so that the focal plane of solar energy collector 1a, 1b is always directed toward the sun. In a similar manner, the mirror 9 may be automatically directed by well known means toward a selected target which may be earth-bound or extraterrestrial. The coordinates in space of the apparatus of FIG. 1, such as when it is in a geosynchronous orbit, are known, as are the coordinates of a target power station located on the surface of the earth, for example. A computation may readily be performed as in FIG. 11, for example, by a conventional control computer 275 provided with conventional manual or other input means as indicated at 275a and 275b of the necessary angles at which mirror 9 must be disposed so that the infrared ray D is properly directed toward the cooperating target in the conventional manner.

Figure 11:
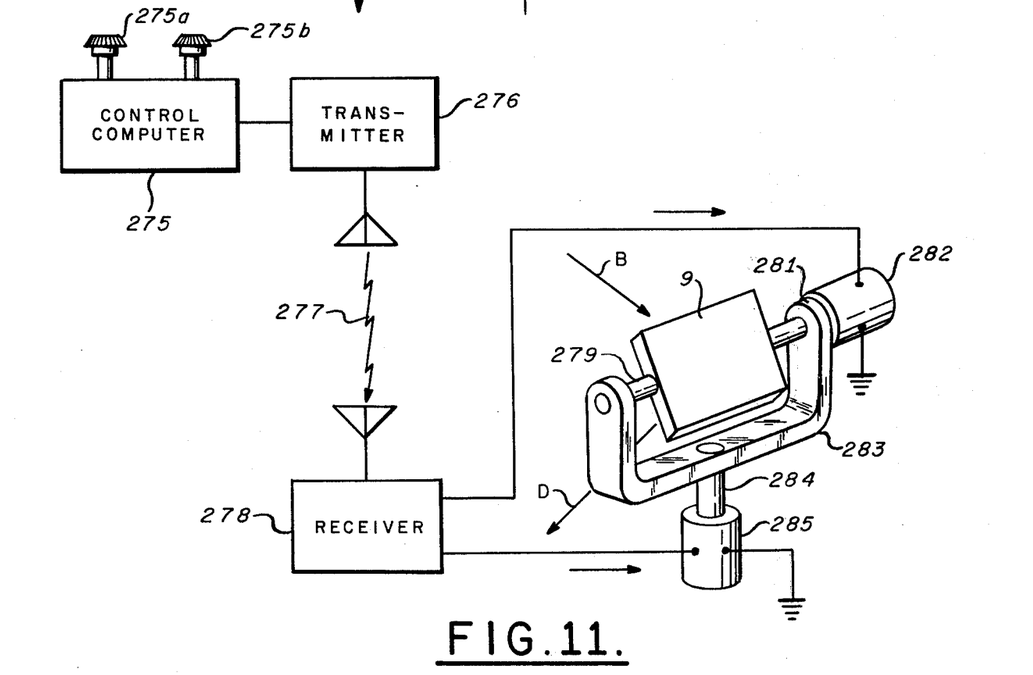
FIGS. 11, 12 and 13 are diagrams of telemetric controls used in operation of the apparatus of FIG. 1.

In FIG. 11, the angular command data is applied in transmitter 276 as suitable modulations upon a carrier wave then is space-radiated from the earth as indicated by arrow 277 to be detected by a receiver 278 disposed on platform frame 14. The angular data, after demodulation in receiver 278, is used to position the rotors of torquers 282 and 285. It is seen that mirror 9 is mounted for positioning about mutually perpendicular axes. Shaft 279, driven by torquer 282, is journalled in the arms of yoke 283 for rotation about a second axis coinciding with shaft 284 by torquer 285. Other well known data transmitter devices may be substituted.

Once mirror 9 is correctly aligned, platform 14 having previously been stabilized in the well known manner, the power converter system is put into operation. As an aid in this and in subsequent periods, the apparatus of FIG. 12 may be employed.

Figure 12:
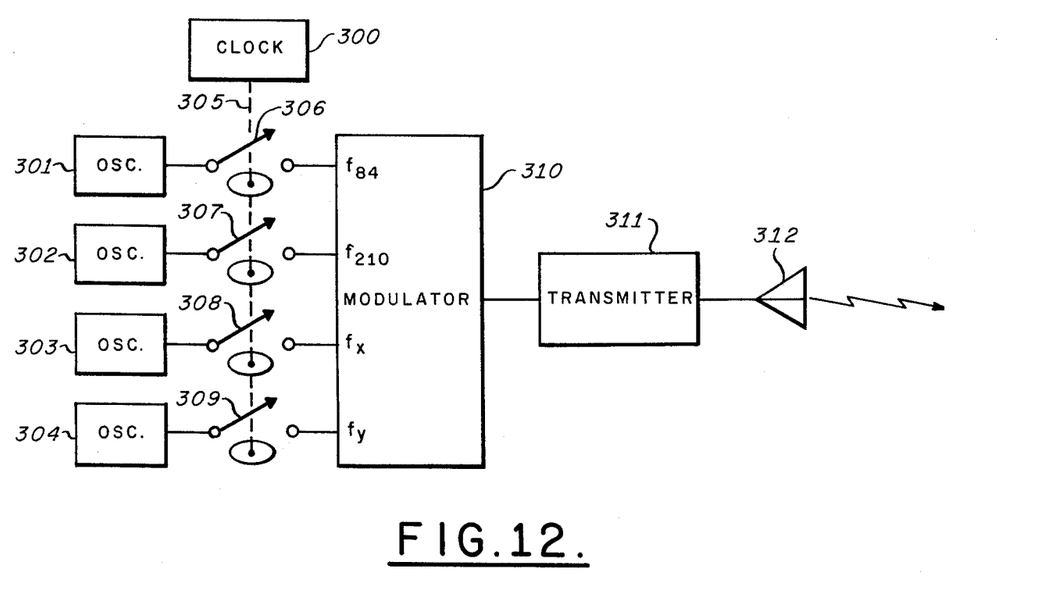

During the operation of the apparatus of FIG. 1, it is desired to control at least motors 94 and 210. For this purpose, a control unit such as shown in FIG. 12 may be employed at the earth's surface, for example. Fixed frequency oscillators 301, 302, 303, 304 may be used selectively to supply corresponding command signals in the form of separated discrete fixed frequencies upon depression or latching of the respective associated switches 306, 307, 308, 309 to modulator 310. The selected command frequency or frequencies are applied by modulator 310 to the carrier signal present in transmitter 311 for radiation by antenna 312 toward the satellite.

Figure 13:
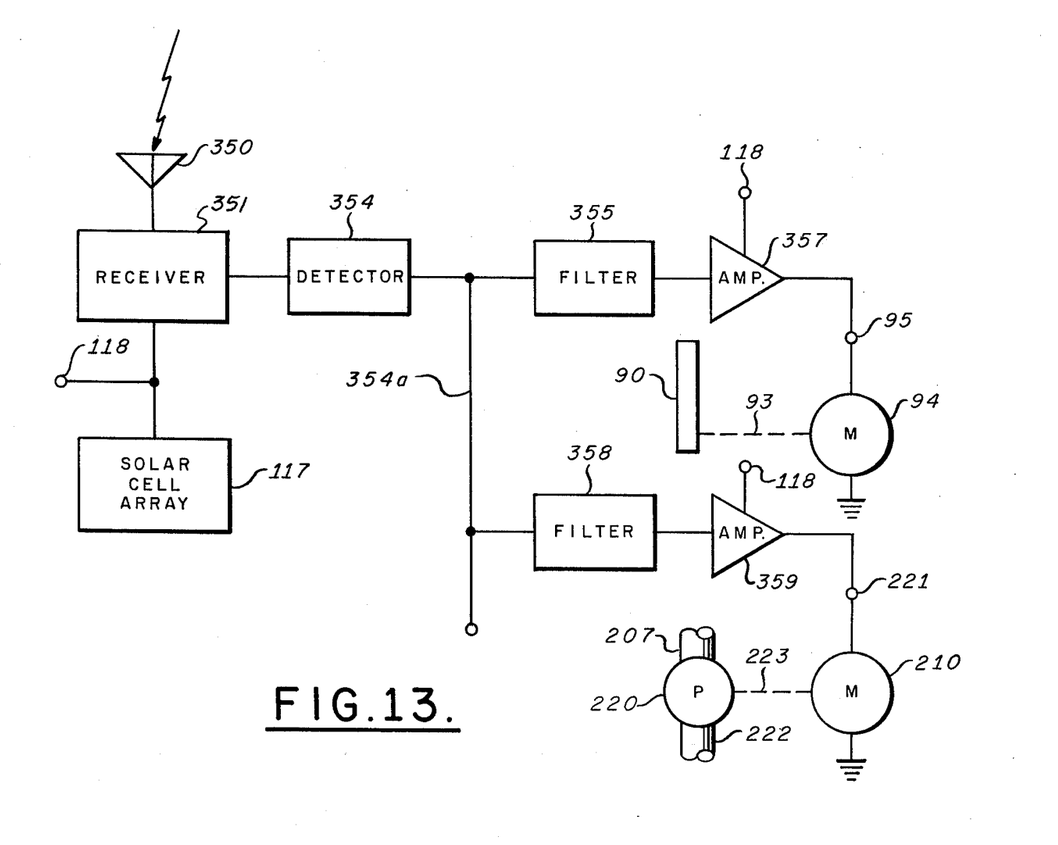

Disposed on the platform frame 14 of FIG. 1 is an antenna 350 and receiver 351 (FIG. 13) cooperating with transmitter 311. Receiver 351 is powered by a solar cell array 117 which may be the array 117 of FIG. 6; other elements of the system may also be powered by the solar cell array 117 via terminals 118, especially as indicated in FIG. 13. The output of receiver 351 is detected at 354 and appears on bus conductor 354a as a signal of frequency or frequencies corresponding to the depressed switch or switches of FIG. 12.

Only the frequency $f_{84}$ of oscillator 301 passes filter 355 in FIG. 13 and is amplified by a.c. amplifier 357 for excitation of motor 94 which serves to move shutter 90 via shaft 93. In a similar manner, only the frequency $f_{210}$ of oscillator 302 passes filter 358 and is amplified by a.c. amplifier 359 for driving motor 210 which spins turbine pump 220 via shaft 223. Other control devices, such as solenoids for various control purposes, may respond to the pressing of keys such as keys 308, 309, similarly to transmit other side band frequencies $f_x$, $f_y$ to the platform 14. Similar and additional filter-amplifier arrangements at the satellite may be employed for such additional control purposes. For example, valves controlled in this manner may be employed in the pipes 208, 222 of the FIG. 10 embodiment to exhaust the gaseous content of the laser into space when, in the instance of certain gas combinations, the gas may become degraded. After closing such valves, other associated valves may be opened by the radio telemetric system and again closed after the laser volume is suitably recharged with fresh gases from supply tanks mounted on frame 14.

In starting and stopping the embodiment of the invention disclosed in FIGS. 1 through 4, the operator depresses switch 306, causing shutter 90 to rotate out of the optical axis B of the laser, the solar cell array 117 having activated at least receiver 351, platform 14 having been stabilized, and mirror 9 having been properly directed at the desired target station. Shortly, the gas found in the lasing region 55 having reached a sufficiently high activity due to solar excitation, laser action initiates continuous production of the infrared energy beam B. Power generation is ended, for example, when further operation of switch 306 and of motor 94 causes shutter 90 again to interrupt beam B. A locally operated electro-optical shutter of known type may be used in lieu of or in combination with mechanical shutter 90 where continuously pulsed operation is desired. Alternative to manual control of operation in the pulsed mode, it will be understood that cyclic starting and stopping of the operation may be automatically achieved simply by the use of a clock motor 300 (FIG. 12) driving a multiple cam assembly 305 which depresses switch 306 through 309 in the desired order for emperically determined time durations.

In the continuous operation of the forms of the invention illustrated in FIGS. 9 and 10, shutter 90 may be opened and motor 210 and pump 220 started simultaneously by depression of switches 306, 307. Continuous operation may be ended by moving shutter 90 back into the path of infrared beam B and then stopping the pump drive motor 21 after an appropriate delay.

It is seen that the invention is a satellite device for the efficient collection of unattenuated solar energy at a station normally outside of the earth's atmosphere and for its relatively efficient conversion in a single conversion process at that station into coherent electromagnetic energy which may be propagated as a narrow beam, substantially unattenuated by the earth's atmosphere, for collection and beneficial use remote from the extraterrestrial station. Employing a single energy conversion process, the satellite station is relatively compact and relatively efficient, providing a beam of infrared energy propagating through the earth's atmosphere with relatively little loss. Short-lived and relatively inefficient components, such as solar cells, are avoided as primary converters, as well as components requiring operation at high voltages. Further, complex phase and frequency controls are unnecessary. Direction of the compact beam of coherent infrared energy is relatively simpler than the direction of a microwave energy beam, the latter being inherently characterized by a significantly wider angular spread.

The invention additionally has the advantages considered to be significant features of the prior art. For example, being in geosynchronous orbit, it is exposed to far more solar energy than is available in those areas on earth that normally receives copious solar energy; and, furthermore, it is available nearly continuously. Because the satellite is geosynchronous, its location can be selected at a desirable place over a preferred site on the earth's surface, for example.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for operation at a stabilized extraterrestrial geosynchronous satellite station for the conversion of solar radiation into a compact beam of electromagnetic energy directed to perform work at a predetermined second station, comprising:
   gas laser means,
      said gas laser means having solar energy absorber means,
      said gas laser means additionally having thermal radiator means for radiation of degraded thermal energy,
      said gas laser means being characterized by producing a compact beam of electromagnetic radiation, when excited by solar energy, along a first path,
   solar radiation collector means normally oriented for maximum coupling of solar energy into said solar energy absorber means along a second path at a substantially right angle to said first path, and
   radiant energy directive means coupled to said thermal radiator means for coupling said degraded energy into space generally in at least part of a plane substantially perpendicular to said second path and spaced from said first path whereby said thermal radiator means is substantially shielded from solar radiation and from said electromagnetic energy beam,
   said gas laser means further comprising:
      closed envelope means, and
      a molecular gas residing within said closed envelope means for forming said solar energy absorber means,
      said closed envelope means including at least one portion transparent to at least a part of the solar spectrum for activating said molecular gas whereby its disassociation is caused, and
      said closed envelope means additionally including a second portion adjacent said one portion for conducting heat from said gas, when disassociated, to said thermal radiator means,
   said one portion of said closed envelope means comprising transparent hollow tube means,
   said second portion of said closed envelope means comprising elongate thermally conducting separator means having aperture means and coupling said transparent hollow tube means to a further transparent hollow tube means of said closed envelope means, and
   said elongate thermally conducting separator means being affixed at an end opposite said aperture means to said thermal radiator means.

2. Apparatus for operation at a stabilized extraterrestrial geosynchronous satellite station for the conversion of solar radiation into a compact beam of electromagnetic energy directed to perform work at a predetermined second station, comprising:
   gas laser means,
      said gas laser means having solar energy absorber means,
      said gas laser means additionally having thermal radiator means for radiation of degraded thermal energy,
      said gas laser means being characterized by producing a compact beam of electromagnetic radiation, when excited by solar energy, along a first path,
   solar radiation collector means normally oriented for maximum coupling of solar energy into said solar energy absorber means along a second path at a substantially right angle to said first path, and
   radiant energy directive means coupled to said thermal radiator means for coupling said degraded energy into space generally in at least part of a plane substantially perpendicular to said second path and spaced from said first path whereby said thermal radiator means is substantially shielded from solar radiation and from said electromagnetic energy beam,
   said gas laser means further comprising:
      closed envelope means, and
      a molecular gas residing within said closed envelope means for forming said solar energy absorber means,
      said closed envelope means including at least one portion transparent to at least a part of the solar spectrum for activating said molecular gas whereby its disassociation is caused,
      said closed envelope means additionally including a second portion adjacent said one portion for conducting heat from said gas, when disassociated, to said thermal radiator means,
   said one portion of said closed envelope means comprising at least a first arcuate elongate sector of an elongate transparent hollow tube,
   said second portion of said closed envelope means comprising at least a second arcuate elongate sector of an elongate thermally-conducting tube cooperating in sealed relation with said one portion for forming said closed envelope means, and
   said second portion being coupled in heat conducting relation with said thermal radiator means.

3. Apparatus for operation at a stabilized extraterrestrial geosynchronous satellite station for the conversion of solar radiation into a compact beam of electromagnetic energy directed to perform work at a predetermined second station, comprising:
   gas laser means,
      said gas laser means having solar energy absorber means,
      said gas laser means additionally having thermal radiator means for radiation of degraded thermal energy,
      said gas laser means being characterized by producing a compact beam of electromagnetic radiation, when excited by solar energy, along a first path,
   solar radiation collector means normally oriented for maximum coupling of solar energy into said solar energy absorber means along a second path at a substantially right angle to said first path, and
   radiant energy directive means coupled to said thermal radiator means for coupling said degraded energy into space generally in at least part of a plane substantially perpendicular to said second path and spaced from said first path whereby said thermal radiator means is substantially shielded from solar radiation and from said electromagnetic energy beam, said gas laser means further including closed envelope means having:
  a first plurality of hollow tubes, transparent to at least a portion of the solar spectrum, and
  a second plurality of elongate heat conducting separators one each interposed in sealed relation between an adjacent pair of said hollow tubes, said elongate heat conducting separators each having apertures therethrough for forming a continuous chamber in cooperation with said hollow tubes,
  said elongate heat conducting separators being affixed at an end opposite said apertures to said thermal radiator means.

4. Apparatus as described in claim 3 wherein said elongate heat conducting separators, in the vicinity of said pairs of hollow tubes, are equipped with reflecting outer edge surfaces so oriented as to reflect solar energy into said pairs of hollow tubes that would otherwise tend to heat said elongate heat conducting separators.

5. Apparatus for operation at a stabilized extraterrestrial geosynchronous satellite station for the conversion of solar radiation into a compact beam of electromagnetic energy directed to perform work at a predetermined second station, comprising:
  gas laser means,
    said gas laser means having solar energy absorber means,
    said gas laser means additionally having thermal radiator means for radiation of degraded thermal energy,
    said gas laser means being characterized by producing a compact beam of electromagnetic radiation, when excited by solar energy, along a first path,
  solar radiation collector means normally oriented for maximum coupling of solar energy into said solar energy absorber means along a second path at a substantially right angle to said first path, and
  radiant energy directive means coupled to said thermal radiator means for coupling said degraded energy into space generally in at least part of a plane substantially perpendicular to said second path and spaced from said first path whereby said thermal radiator means is substantially shielded from solar radiation and from said electromagnetic energy beam,
  said gas laser means comprising:
    hollow tubular closed envelope means having opposed longitudinal portions transparent to at least a part of the solar spectrum,
    opposed longitudinal heat conducting surface means interposed between said opposed longitudinal transparent portions, and
    a molecular gas residing within said hollow tubular closed envelope means,
    said solar radiation collector means being disposed for the direction of solar energy through said longitudinal transparent portions for activating said molecular gas adjacent the axis of said hollow tubular closed envelope means thereby causing disassociation of said molecular gas,
    said opposed longitudinal heat conducting means being disposed for cooling said molecular gas, when disassociated, and
    coolant transfer means coupled to said thermal radiator means for cooling said opposed longitudinal heat conducting surface means.

6. Apparatus as described in claim 5 additionally including radio control means at said second predetermined station for controlling flow of coolant serially through said coolant transfer means and said thermal radiator means.

7. Apparatus for operation at a stabilized extraterrestrial geosynchronous satellite station for the conversion of solar radiation into a compact beam of electromagnetic energy directed to perform work at a predetermined second station, comprising:
  gas laser means,
    said gas laser means having solar energy absorber means,
    said gas laser means additionally having thermal radiator means for radiation of degraded thermal energy,
    said gas laser means being characterized by producing a compact beam of electromagnetic radiation, when excited by solar energy, along a first path,
  solar radiation collector means normally oriented for maximum coupling of solar energy into said solar energy absorber means along a second path at a substantially right angle to said first path, and
  radiant energy directive means coupled to said thermal radiator means for coupling said degraded energy into space generally in at least part of a plane substantially perpendicular to said second path and spaced from said first path whereby said thermal radiator means is substantially shielded from solar radiation and from said electromagnetic energy beam,
  said gas laser means comprising:
    innser tubular manifold means having a first array of radially disposed bores,
    outer tubular manifold means having a second array of radially disposed bores,
      said outer and inner tubular manifold means cooperatively defining a closed laser interaction volume,
    a molecular gas residing within said interaction volume,
      said solar radiation collector means being disposed for the direction of solar energy through said outer tubular manifold means for activating said molecular gas adjacent said inner tubular manifold means, thereby causing its photolysis, and
    fluid pump means for transfer of said molecular gas after photolysis from said outer tubular manifold means through said thermal radiator means, returning said molecular gas to said inner tubular manifold means in recombined condition.

8. Apparatus as described in claim 7 wherein said inner tubular manifold means is composed of metal having surface reflecting properties for solar energy.

9. Apparatus as described in claim 7 wherein said inner tubular manifold means is composed of metal having a solar energy absorbing surface.

10. Apparatus as described in claim 7 wherein said outer tubular manifold means is composed of quartz.

11. Apparatus for operation at a stabilized extraterrestrial geosynchronous satellite station for the conversion of solar radiation into a compact beam of electromagnetic energy directed to perform work at a predetermined second station, comprising:

gas laser means,
- said gas laser means having solar energy absorber means,
- said gas laser means additionally having thermal radiator means for radiation of degraded thermal energy,
- said gas laser means being characterized by producing a compact beam of electromagnetic radiation, when excited by solar energy, along a first path, solar radiation collector means normally oriented for maximum coupling of solar energy into said solar energy absorber means along a second path at a substantially right angle to said first path, and radiant energy directive means coupled to said thermal radiator means for coupling said degraded energy into space generally in at least part of a plane substantially perpendicular to said second path and spaced from said first path whereby said thermal radiator means is substantially shielded from solar radiation and from said electromagnetic energy beam, said gas laser means comprising:
- first and second coaxially disposed hollow tubular means forming therebetween gas output manifold means,
- said gas output manifold means being transparent to at least a portion of the solar spectrum,
- said second hollow tubular means lying within said first hollow tubular means and including at least one array of first radial bores,
- third coaxially disposed tubular means forming gas input manifold means and defining a laser interaction volume with respect to said second hollow tubular means,
- said third coaxially disposed tubular means including at least one array of second radial bores,
- said first, second, and third coaxially disposed hollow tubular means cooperatively forming sealed envelope means,
- a molecular gas residing within said sealed envelope means, and
- fluid pump means for transfer of said molecular gas from said gas output manifold means and through said thermal radiator means, returning said molecular gas to said gas input manifold means in recombined condition.

* * * * *